No. 7,646. PATENTED SEPT. 17, 1850.
F. A. CALVERT.
MACHINERY FOR PICKING COTTON.
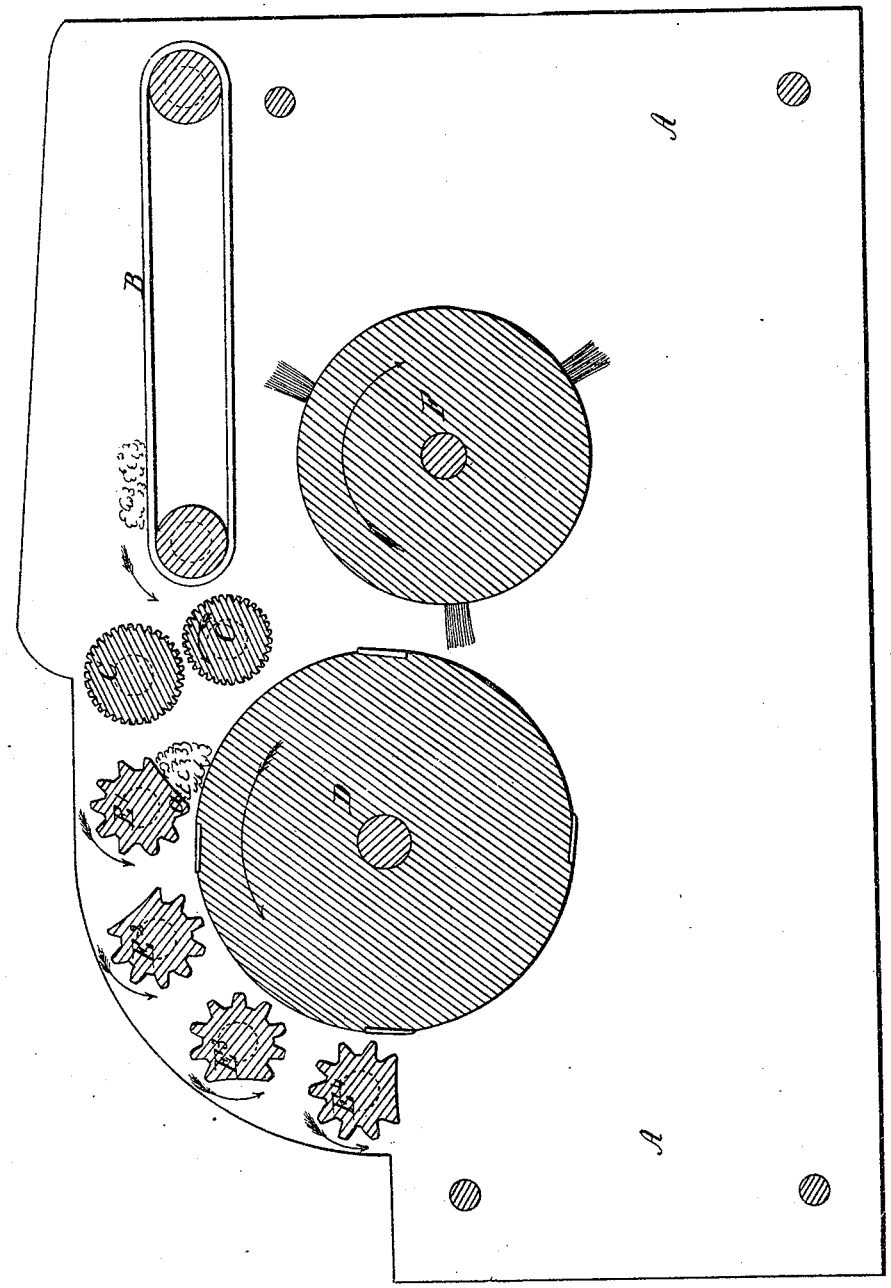

UNITED STATES PATENT OFFICE.

F. A. CALVERT, OF LOWELL, MASSACHUSETTS.

IMPROVEMENT IN MACHINERY FOR GINNING OR PICKING COTTON.

Specification forming part of Letters Patent No. 7,646, dated September 17, 1850.

*To all whom it may concern:*

Be it known that whereas I, FRANCIS ALTON CALVERT, of Lowell, in the county of Middlesex, in the Commonwealth of Massachusetts, one of the United States of America, have invented certain Improvements in Machinery for Picking Cotton or Cotton-Gins: Now know ye that I, the said FRANCIS ALTON CALVERT, do hereby declare the nature of my said invention to consist in an improved machine for picking cotton—that is, in a machine by which the fibers of cotton are torn from the seeds and from any other extraneous matter which may be mixed with them, whereby the separated fibers are less broken after the operation of such picking than is the case with machines which have heretofore been used for the same purpose.

The drawing is a side elevation in section of my improved machine.

A is one of the side casings in which suitable bearings are fixed for the axes of the working parts.

B is an endless band, constructed of any material capable of conveying cotton to a pair of feed-rollers.

C C are the feed-rollers, constructed so as pass the cotton to the combs or toothed cylinder D. This cylinder, from preference, I make of iron, though it may be made of any other suitable material. On the surface of this cylinder is placed a number of combs running parallel with its axis. The teeth of these combs may project beyond the periphery of the cylinder, or they may be concentric with it; but in the latter case a groove is made under their points. This cylinder, without departing from my invention, may be made of a series of disks with teeth on the surface at right angles to the axis; or the teeth on the cylinder may be arranged at any angle between those I have already described, the first of which are parallel to the axis, and the second at right angles to it.

E are rollers or bars made to revolve in the same direction as the toothed cylinder D. These rollers or bars are so constructed that in any plane through them at right angles with their axis a gap or blank space is left as shown in the drawing.

F is a cylinder made to revolve in the contrary direction of the combs or toothed cylinder D, and at a greater speed. Upon the periphery of this cylinder a series of brushes or a continuous brush is fixed, of any suitable material; but I prefer one made from bristles.

The operation of my improved machine is as follows: The cotton which has to be picked or torn from the seeds or other impurities is placed, in the usual manner adopted in former picking-machines, upon the endless band B, the upper side of which is made to move toward the feed-rollers in the direction shown by an arrow; but this band has not a continuous uniform motion, but, on the contrary, it has an intermittent motion only—that is, it is made to move through a certain space and then to stop, by any well-known machinery—such as the Geneva stop-motion, or wheels having teeth on only a part of their periphery. The effect of this action on the endless band is that the feed-rollers are only supplied at intervals from the cotton on its surface.

The drawing exhibits the machine after the feed-rollers have delivered a portion of cotton onto the surface of the comb or toothed cylinder and are for a time at rest, but all the other parts of the machine are in active operation. The cotton so delivered is carried by the teeth on the cylinder D against the roller or bar E' when in the position shown, and those fibers which have been caught by the teeth are carried forward under the roller or bar E', and any seeds or other extraneous matter to which they affixed are arrested and separated by the projecting point of E' at $a$. As all the other parts of the machine revolve at a uniform speed, except the endless band and the feed-rollers, the cotton shown to have been first delivered is continuously acted upon by the teeth in the cylinder D until the gap or blank space in E' becomes concentric with the cylinder D, if circular; or if of another form, leaves such an opening between the cylinder D and itself that the cotton, by the action of the cylinder D, has room to escape to the next roller or bar, $E^2$, which roller or bar is not then in the position shown in the drawing, but it is then in the same relative position with the cylinder D, as shown in the drawing, that E' has to D, and such is the action of the succeeding rollers or bars $E^3$ and $E^4$ with reference to the cotton carried forward by the cylinder D.

It will be seen, on examination of this drawing, that each roller or bar E forces the fibers of the cotton in one direction so long as they are attached to seeds or other extraneous matter, while the teeth on the cylinder D continue to carry forward all such fibers as are disengaged from the seeds. Thus, by the continuous action of the teeth of the cylinder D on the uncleaned and unpicked fibers of cotton and the change of position, the cotton is forced into by the arresting-rollers E, all the seeds and extraneous matter are torn from the cotton fibers, and the picked or cleaned cotton is carried forward in the teeth of the cylinder D, and are withdrawn from them as they come in contact with the surface of the brush F.

With regard to the speed of the various cylinders and rollers, I do not bind myself to any particular speeds, for, according to the quality of the cotton and other circumstances, various relative speeds may be necessary, and may be used when necessary; and I do not bind myself to any particular gearing, but claim leave to use any gearing by which I can attain the relative motions above specified.

Having now described the nature of my invention and the manner in which I carry it into effect, I hereby declare that I do not claim any of the parts separately; but

What I do claim is—

The combination of such parts as I have shown, forming a picking-machine, and their mode of action, as hereinbefore described.

Dated London February 8, 1850.

FRS. A. CALVERT.

Witnesses:
 JOSEPH MARQUETTE,
 WILLIAM EWING,
  1 *Bishopsgate Churchyard, London.*